United States Patent
Shashurin et al.

(10) Patent No.: US 11,946,871 B2
(45) Date of Patent: Apr. 2, 2024

(54) SYSTEMS AND METHODS FOR MEASURING A TEMPERATURE OF A GAS

(71) Applicant: Purdue Research Foundation, West Lafayette, IN (US)

(72) Inventors: Alexey Shashurin, West Lafayette, IN (US); Xingxing Wang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 16 days.

(21) Appl. No.: 17/085,856

(22) Filed: Oct. 30, 2020

(65) Prior Publication Data
US 2021/0199590 A1    Jul. 1, 2021

Related U.S. Application Data

(60) Provisional application No. 62/955,269, filed on Dec. 30, 2019.

(51) Int. Cl.
*G01N 21/67* (2006.01)
*G01N 21/17* (2006.01)

(52) U.S. Cl.
CPC ......... *G01N 21/67* (2013.01); *G01N 21/1702* (2013.01); *G01N 2021/1704* (2013.01)

(58) Field of Classification Search
CPC ...... G01N 21/718; G01N 21/73; G01N 21/68; G01N 2201/067; G01N 27/68; G01N 21/6402; G01N 30/30; G01N 21/67; G01N 21/1702; G01N 2021/1704; G01J 3/0208; G01J 3/18; G01J 3/0218; G01J 3/443; G01J 5/0014
See application file for complete search history.

(56) References Cited

U.S. PATENT DOCUMENTS

| 3,842,284 A | * | 10/1974 | Berta | ................... H01S 3/09775 372/86 |
| 5,422,543 A | * | 6/1995 | Weinberg | ............... G03B 15/05 315/129 |
| 5,751,416 A | * | 5/1998 | Singh | ..................... G01J 3/021 356/417 |

(Continued)

FOREIGN PATENT DOCUMENTS

| CN | 103245655 A | * | 8/2013 | |
| CN | 105484011 A | * | 4/2016 | ............ D06M 10/02 |

(Continued)

OTHER PUBLICATIONS

Zhang et al. "Rotational, Vibrational, and Excitation Temperatures in Bipolar Nanosecond-Pulsed Diffuse Dielectric-Barrier-Discharge Plasma at Atmospheric Pressure", IEEE Tran. plasma Sci. vol. 41 (2013), pp. 350-354.*

*Primary Examiner* — Mohamed K Amara
(74) *Attorney, Agent, or Firm* — Hartman Global IP Law; Gary M. Hartman; Domenica N. S. Hartman

(57) ABSTRACT

Methods and systems capable of measuring gas temperatures utilizing plasma discharges. Such a method performs a measurement of a temperature of a gas by generating a probing nanosecond plasma pulse in the gas, and then using an optical emission spectroscopy technique to measure the temperature of the gas by processing a light emission signal excited by the probing nanosecond plasma pulse.

17 Claims, 6 Drawing Sheets

(56) References Cited

U.S. PATENT DOCUMENTS

| | | | | |
|---|---|---|---|---|
| 5,866,073 | A * | 2/1999 | Sausa | G01N 21/631 250/338.5 |
| 6,321,601 | B1 * | 11/2001 | Maris | G01N 21/211 73/657 |
| 9,080,982 | B1 * | 7/2015 | Asprey | G01N 21/68 |
| 10,386,231 | B2 * | 8/2019 | Iguchi | G02F 1/37 |
| 10,499,486 | B2 * | 12/2019 | Cha | H05H 1/48 |
| 2002/0018505 | A1 * | 2/2002 | Basting | B23K 26/705 372/55 |
| 2002/0175294 | A1 * | 11/2002 | Lee | G01N 21/6402 250/461.1 |
| 2005/0267694 | A1 * | 12/2005 | Buckley | G01N 21/718 73/23.31 |
| 2007/0222981 | A1 * | 9/2007 | Ponsardin | G01J 3/44 356/301 |
| 2008/0069171 | A1 * | 3/2008 | Rocca | G02F 1/3501 372/61 |
| 2008/0231337 | A1 * | 9/2008 | Krishnaswamy | H03K 3/537 327/291 |
| 2008/0258071 | A1 * | 10/2008 | Arnold | G01N 21/6402 250/373 |
| 2009/0259410 | A1 * | 10/2009 | Fichet | G01J 3/443 702/23 |
| 2014/0218729 | A1 * | 8/2014 | Marcus | G01N 21/67 250/288 |
| 2014/0268133 | A1 * | 9/2014 | McManus | G01J 3/28 356/316 |
| 2014/0336626 | A1 * | 11/2014 | Jiang | A61B 18/26 606/2.5 |
| 2015/0131700 | A1 * | 5/2015 | Chrystie | G01J 3/42 374/161 |
| 2016/0054284 | A1 * | 2/2016 | Washburn | G01N 21/718 356/318 |
| 2016/0116415 | A1 * | 4/2016 | Gaft | G01N 21/718 356/318 |
| 2016/0195509 | A1 * | 7/2016 | Jamieson | G01N 21/718 356/70 |
| 2018/0348141 | A1 * | 12/2018 | Hardman | G01J 1/44 |
| 2019/0137403 | A1 * | 5/2019 | Gapontsev | G01J 3/0202 |
| 2020/0316720 | A1 * | 10/2020 | Liu | B33Y 50/02 |
| 2021/0106968 | A1 * | 4/2021 | Dobrynin | C01B 21/08 |
| 2021/0254826 | A1 * | 8/2021 | Kendrick | F23N 5/003 |

FOREIGN PATENT DOCUMENTS

| | | | | |
|---|---|---|---|---|
| CN | 106030289 | A * | 10/2016 | G01J 3/0221 |
| CN | 108109938 | A * | 6/2018 | G01J 3/0205 |
| CN | 109444140 | A * | 3/2019 | G01N 21/01 |
| FR | 2904155 | A1 * | 1/2008 | F02P 15/08 |
| JP | 2013238130 | A * | 11/2013 | F02P 3/01 |
| KR | 19980073052 | A * | 11/1998 | H05H 1/00 |
| KR | 20110041119 | A * | 4/2011 | H05H 1/36 |
| KR | 20110041124 | A * | 4/2011 | H05H 1/36 |
| KR | 20210134761 | A * | 11/2021 | B01D 53/32 |
| WO | WO-02068937 | A1 * | 9/2002 | A61B 5/0095 |
| WO | WO-2022051423 | A1 * | 3/2022 | A61B 3/10 |

* cited by examiner

SYSTEMS AND METHODS FOR MEASURING A TEMPERATURE OF A GAS

CROSS-REFERENCE TO RELATED APPLICATIONS

This application claims the benefit of U.S. Provisional Application No. 62/955,269 filed Dec. 30, 2019, the contents of which are incorporated herein by reference.

STATEMENT REGARDING FEDERALLY SPONSORED RESEARCH OR DEVELOPMENT

This invention was made with government support under Grant No. DE-SC0018156 awarded by Department of Energy and Grant No. 1903415 awarded by the National Science Foundation. The government has certain rights in the invention.

BACKGROUND OF THE INVENTION

The present invention generally relates to methods and equipment for measuring gas temperature. The invention particularly relates to methods and systems for measuring rotational temperatures and bulk gas temperatures utilizing nanosecond repetitively pulsed discharge.

Nanosecond repetitively (or repetitive) pulsed (NRP) discharge refers to nanosecond-duration electrical (plasma) pulses at high power to generate high energy electrons that are not created in discharges created by longer electrical pulses, for example, pulses with durations of one microsecond and longer. NRP discharges are of considerable interest in combustion-related applications, including but not limited to increasing flame speed, enhancing flame stabilization at low fuel/oxidizer ratio, and mitigating combustion instability. In addition, NRP discharges have been applied for aerodynamic flow controls. Surface dielectric barrier discharge (DBD) plasmas driven by NRP discharges have been explored for controlling boundary layers at realistic flight conditions and for shock wave modification in supersonic flow. NRP sparks have also been shown to be effective at inducing flow instabilities by generating pressure waves.

Comprehensive temporally resolved measurements of the NRP plasma properties are critical for understanding the nature of the plasmas and practical applications. Two of the most important parameters of theses discharges are total electron number/electron number density and rotational and vibrational temperatures. Electron number density is a measure of the total electrons produced during discharge which implies the amount of reactive species produced. In previous studies reported in Wang et al., "Experimental Study of Modes of Operation of Nanosecond Repetitive Pulsed Discharges in Air," in AIAA Scitech, San Diego, CA (2019) and Wang et al., "Time-Resolved Measurements of Electron Density in Nanosecond Pulsed Plasmas Using Microwave Scattering," Plasma Source Sci. Technol., vol. 27, no. 07LT02 (2018), the total electron numbers of a plasma produced in a high-voltage (HV) NRP discharge in a pin-to-pin configuration were conducted at atmospheric pressure and room temperature where high-voltage electrical pulses with peak values of 26 kV and pulse widths of 100 ns were applied to pin electrodes at a frequency of 1 kHz. The total electron number was measured by a Rayleigh Microwave Scattering (RMS) technique. It was found that for the spark discharge, the amount of total electrons produced ranged from $2.4 \times 10^{12}$ to $1.2 \times 10^{13}$ and the spatially-averaged electron number density ranged from $0.9 \times 10^{14}$ to $1.0 \times 10^{17}$ cm' when the gap distance between the pin electrodes was changed from 3 mm to 9 mm.

Rotational temperature is often used as a measure of bulk gas temperature for NRP discharges at atmospheric pressure based on fast rotational-translational relaxation and predominant creation of $N_2(C)$ by electron-impact excitation of $N_2(X)$. Vibrational temperatures are typically substantially higher than rotational temperatures, which is indicative of the high degree non-equilibrium inherent to NRP discharges. In Wang et al., "Experimental Study of Modes of Operation of Nanosecond Repetitive Pulsed Discharges in Air," in AIAA Scitech, San Diego, CA (2019), both rotational and vibrational temperatures of NRP plasmas were measured with 5 ns temporal resolution. However, these measurements were limited to only the first approximately 20 ns of the discharge. Rotational and vibrational temperatures were determined from the measurements of the nitrogen second positive system with $\Delta v=-2$ based on the classical optical emission spectroscopy (OES) approach to fit the measured spectra with a synthetic spectra generated numerically. It was observed that the second positive system of nitrogen only existed for the first 20 ns of the discharge event and, therefore, rotational and vibrational temperatures were only determined during that initial stage of the discharge. Afterwards the emission of the $N_2$ second positive system disappeared due to the decrease of the reduced field E/N below the favorable range of about $10^{-16}$ to $10^{-15}$ V·cm$^2$ as the dense plasma channel was forming between the discharge electrodes.

In view of the above, measurements of gas temperatures in atmospheric pressure NRP discharges using OES techniques are limited to only the initial 20 ns after the discharge has initiated in the gas (breakdown). However, gas temperature data on a significantly longer time scale than the initial 20 ns time period of the NRP discharge (microseconds to milliseconds after breakdown) are necessary for analysis of flow induced effects by NRP discharges and their applications in combustion systems.

Thus, there is an unmet need for methods and systems capable of measuring gas temperatures utilizing plasma discharges.

BRIEF SUMMARY OF THE INVENTION

The present invention provides methods and systems capable of measuring gas temperatures utilizing plasma discharges.

According to one aspect of the invention, a method of performing a measurement of a temperature of a gas includes generating a probing nanosecond plasma pulse in the gas, and then using an optical emission spectroscopy technique to measure the temperature of the gas by processing a light emission signal excited by the probing nanosecond plasma pulse.

According to another aspect of the invention, a system for performing a measurement of a temperature of a gas includes means for generating a probing nanosecond plasma pulse in the gas and an optical emission spectrometer that receives a light emission signal excited by the probing nanosecond plasma pulse.

Other aspects of the invention will be appreciated from the following detailed description.

BRIEF DESCRIPTION OF THE SEVERAL VIEWS OF THE DRAWING

In FIG. 4A emission bands are distinguishable in the initial 20 ns after breakdown, and in FIG. 4B no bands of emission can be acquired for fitting after the initial 20 ns.

DETAILED DESCRIPTION OF THE INVENTION

The following describes systems and methods of performing gas temperature measurements with temporal resolutions that enable the systems and methods to be used for a variety of applications as a thermometer, as a nonlimiting example, in combustion applications. The systems and methods are based on rotational and vibrational temperature measurements utilizing optical emission spectroscopy (OES) of the second positive system of nitrogen used in conjunction with a probing nanosecond plasma pulse (sometimes referred to herein simply as a "probing pulse"). As used herein, the term "plasma" encompasses such terms as glow discharge, corona discharge, arc, and spark. The probing pulse is used to excite the emission of the second positive system of nitrogen at a desired moment of time. Investigations reported below demonstrate that it is physically feasible to establish pulsing probe parameters so that heating of the gas caused by the probing pulse itself is negligible, while the emission of the second positive system of nitrogen is sufficient to conduct OES measurements. According to preferred aspects, the spectrum may be acquired during the first 5 ns after probing pulse initiation in order to eliminate the effect of the probing pulse gas heating on the measured temperature. The method is further applied to conduct the gas temperature measurements in the wake of an atmospheric nanosecond repetitively (repetitive) pulsed (NRP) discharge from the moment of discharge initiation to a time period after breakdown of the gas.

The following are symbols and nomenclature employed in this disclosure: d is the gap distance between two electrodes; V is the voltage measured between the electrodes; I is the current measured between the electrodes; $T_{rot}$ is the rotational temperature; $T_{vib}$ is the vibrational temperature; and t is time.

In experiments leading to this disclosure, the nanosecond plasma pulses were generated between two pin tungsten electrodes. Each tungsten electrode had a tip diameter of approximately 200 micrometers and was connected to one output arm of an Eagle Harbor nanosecond pulse generator (NSP-3300-20-F) where the gap distance (d) between the electrodes was maintained at 5 mm. A pulse with peak voltage value of 26 kV and width of 120 ns was used. The pulse generator was operated in a differential mode such that each output arm of the pulser generated a ns-pulse of the same amplitude but opposite polarity with respect to ground. The voltage was measured by two 30 kV rated high-voltage probes (Tektronix P6015A) connected to each electrode and the actual voltage applied to the electrodes was calculated as the difference between two probe readings. The current was measured by a current transformer probe (Bergoz FCT-028-0.5-WB) connected to the positive arm of the pulse generator.

Figure 1:
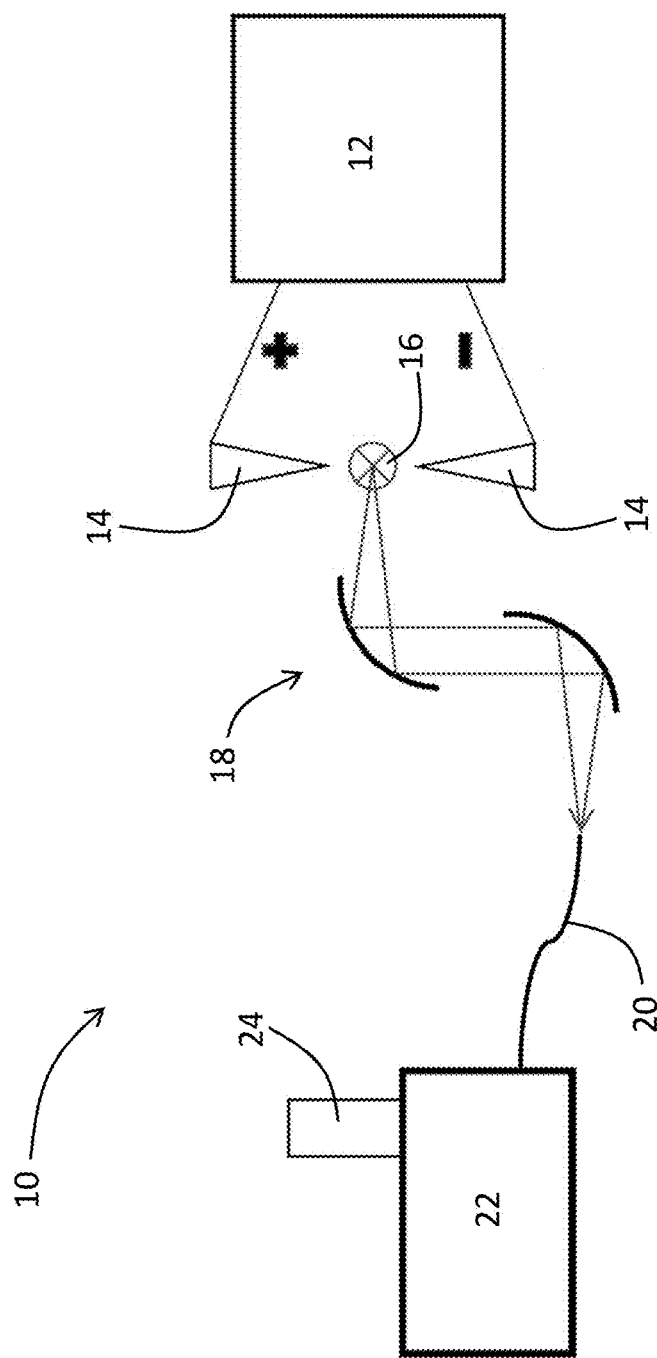
FIG. 1 schematically represents a system utilizing an optical emission spectroscopy (OES) technique enhanced by nanosecond probing pulse to perform temperature measurements in investigations leading to the invention.

A optical emission spectroscopy system 10 used in the investigations was implemented as schematically represented in FIG. 1, which represents a high-voltage nanosecond pulse generator 12 with two electrodes 14. A gap having a gap distance (d) is defined between the electrodes 14 within which a plasma discharge 16 is generated by the pulse generator 12. For the purpose of creating a plasma discharge 16 across the gap between the electrodes 14, as used herein "high voltage" means voltages of greater than 1 kV, more preferably at least 15 kV, and most preferably at least 20 kV. The discharge 16 generates a light emission signal that is collected by a parabolic mirror system 18 (focal length of 4 inches (about 10 cm)), projected 1:1 onto the input plane of an optic fiber 20, and then transferred to an optical emission spectrometer 22 (Princeton Instrument Acton SpectraPro SP-2750). The converted spectrum data are recorded, for example, by an intensified charge-coupled device (ICCD) camera 24 (Princeton Instrument PI-MAX 1024i) mounted to the spectrometer 18. Nitrogen second positive system (C→B) with a spectral band of $\Delta v = v' - v'' = -2$ can be captured for utilizing a synthetic spectra simulated in SPECAIR, a computer program that models radiative spectra for plasmas and is commercially available from SpectralFit S.A.S.

Figure 2:
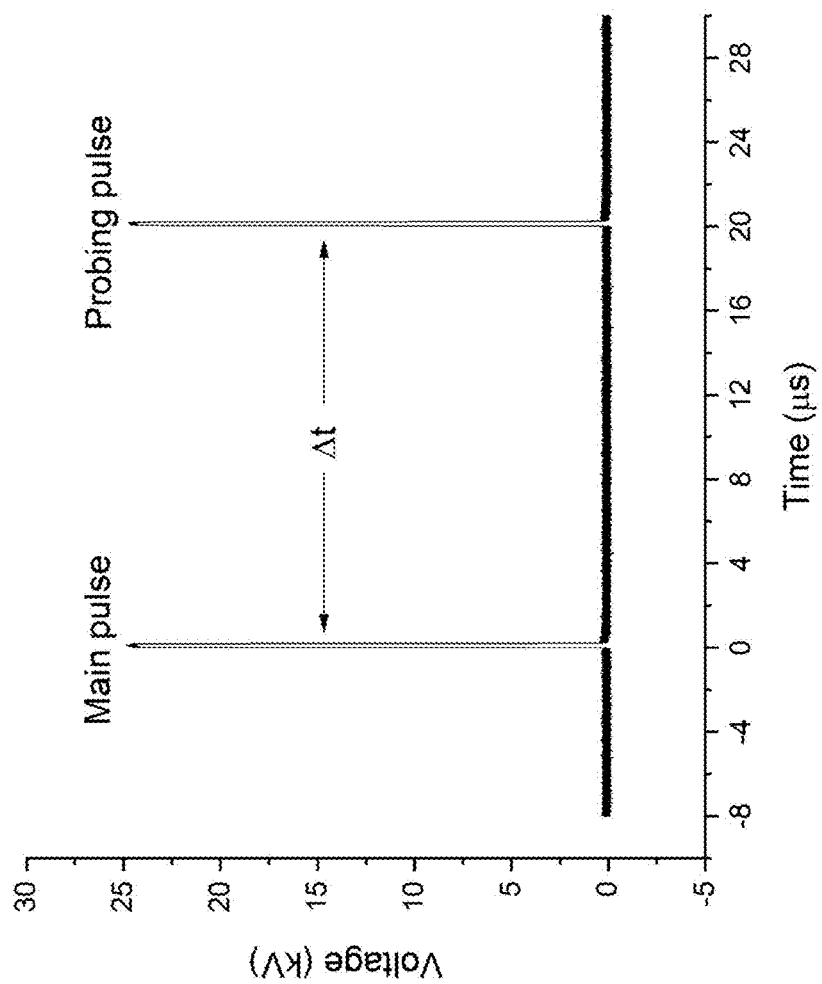
FIG. 2 is a graph plotting a sample waveform that illustrates a nanosecond repetitively pulsed (NRP) discharge and a subsequent probing pulse applied with a delay of $\Delta t = 20$ microseconds.

For temperature measurements in the initial 20 ns of the discharge, the gate width of the ICCD camera 24 was set at 5 ns and a time step at 5 ns. Approximately 50-200 samples were accumulated to achieve an adequate signal-to-noise ratio for further spectrum fitting depending on the intensity of the light emission signal of the discharge 16. For temperature measurements after the NRP discharge, a high voltage (probing) pulse was applied to the electrodes 16 with a controlled delay in order to initiate additional breakdown and excite emission of a second positive system of $N_2$. The spectrum within the first 5 ns of the probing pulse was recorded to eliminate the effect of gas heating attributable to the probing pulse on the measured temperature (discussed below). Five hundred spectrum samples were accumulated on the memory chip of the ICCD camera 24 to improve the signal-to-noise ratio of the spectrum. The time intervals between the NRP discharge and the probing pulse were chosen to be 20, 50, 100, 200, 500, 1000, 2000 and 5000 microseconds (20 microseconds was the earliest time at which a probing breakdown was attained with the particular nanosecond pulse generator 12 used in the investigations). The sample waveform illustrating a NRP discharge pulse and a subsequent probing pulse is plotted in FIG. 2, with delay $\Delta t = 20$ microseconds. The NRP discharges were at a repetition frequency of 1 Hz to ensure the temperature relaxation to room temperature prior to the each subsequent NRP pulse.

Figure 3:
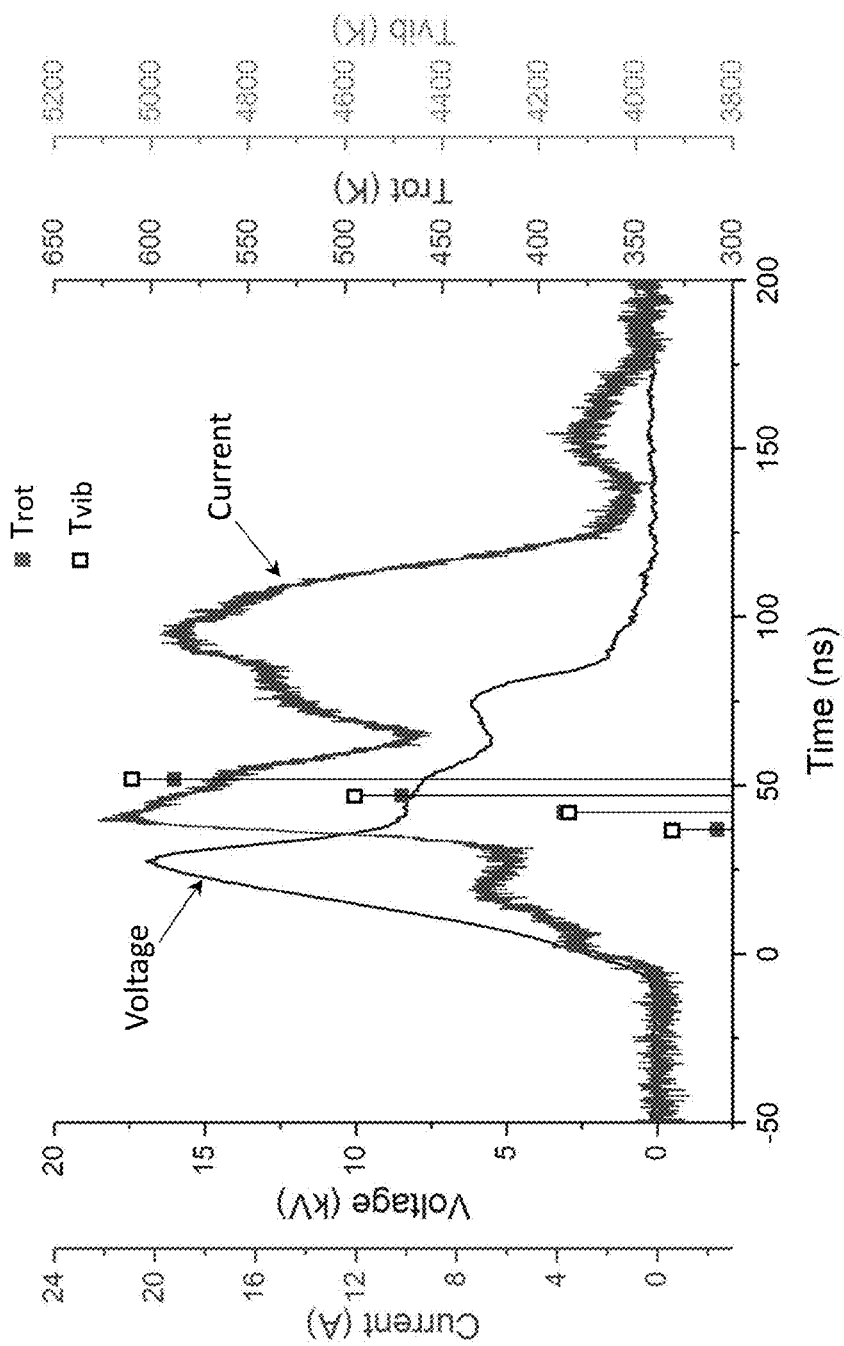
FIG. 3 is a graph plotting the temporal evolution of voltage, current, rotational temperature, and vibrational temperature for an NRP discharge during an investigation leading to the invention.
Figures 4A, 4B:
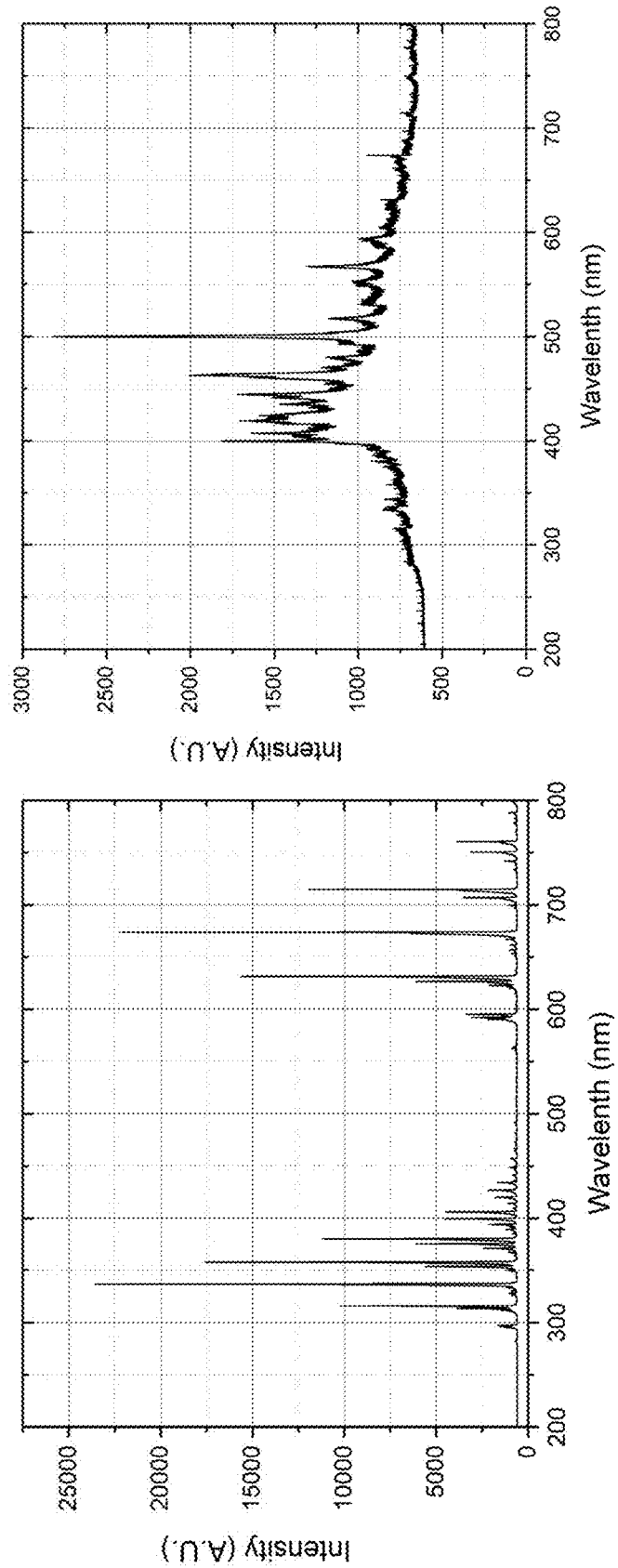
FIGS. 4A and 4B are graphs plotting full spectrum from 200 nm to 800 nm of the light emission of an NRP discharge 20 ns after breakdown (FIG. 4A) and 20-40 ns after breakdown (FIG. 4B).

FIG. 3 plots the temporal evolution of the voltage (V), current (I), rotational temperature ($T_{rot}$), and vibrational temperature ($T_{vib}$) that was measured for the initial 20 ns of the NRP discharge. It is seen that when a breakdown voltage of approximately 17 kV was reached at t=35 ns, followed by a discharge current peak of 22 A. Rotational and vibrational temperatures were measured within the time interval of t=35-55 ns with 5 ns temporal resolution using an OES technique. Within this time interval, $T_{rot}$ increased from 300 K to 600 K, and $T_{vib}$ increased from 3900 K to 5020 K. The second positive system of the $N_2$ spectrum appeared only during the first 20 ns after breakdown and disappeared thereafter. An example of the spectra obtained in the first 20 ns after breakdown (t=35-55 ns) and in the subsequent 20 ns (t=55-75 ns) are shown in FIGS. 4A and 4B. Multiple spectral bands including the second positive system are clearly evident in only the spectrum acquired during the first 20 ns. Therefore, $T_{rot}$ and $T_{vib}$ were determined by OES during the time interval t=35-55 ns only. Vanishing of the $N_2$ second positive system in the emission spectrum can be explained by the quenching of the corresponding excited vibrational and rotational levels, and absence of the new excitations. Indeed, according to Raizer, Gas Discharge Physics, Berlin: Springer-Verlag, pp. 350-352 (1991), a reduced electric field $E/N \geq 10^{-15}$ V·cm$^{-2}$ is required for efficient pumping of electronic excitations, vibrations, and ionization of $O_2$ and $N_2$, while efficiency of these transitions decreases for lower reduced fields. Rough estimations of the reduced electric field based on the discharge voltage experimental data shown in FIG. 3 confirm that the reduced electric field was about $10^{-15}$ V·cm$^{-2}$ for the initial 20 ns after breakdown, and then dropped significantly due to the creation of a highly conductive spark channel between the electrodes and an associated decrease of the discharge voltage.

Figure 5:
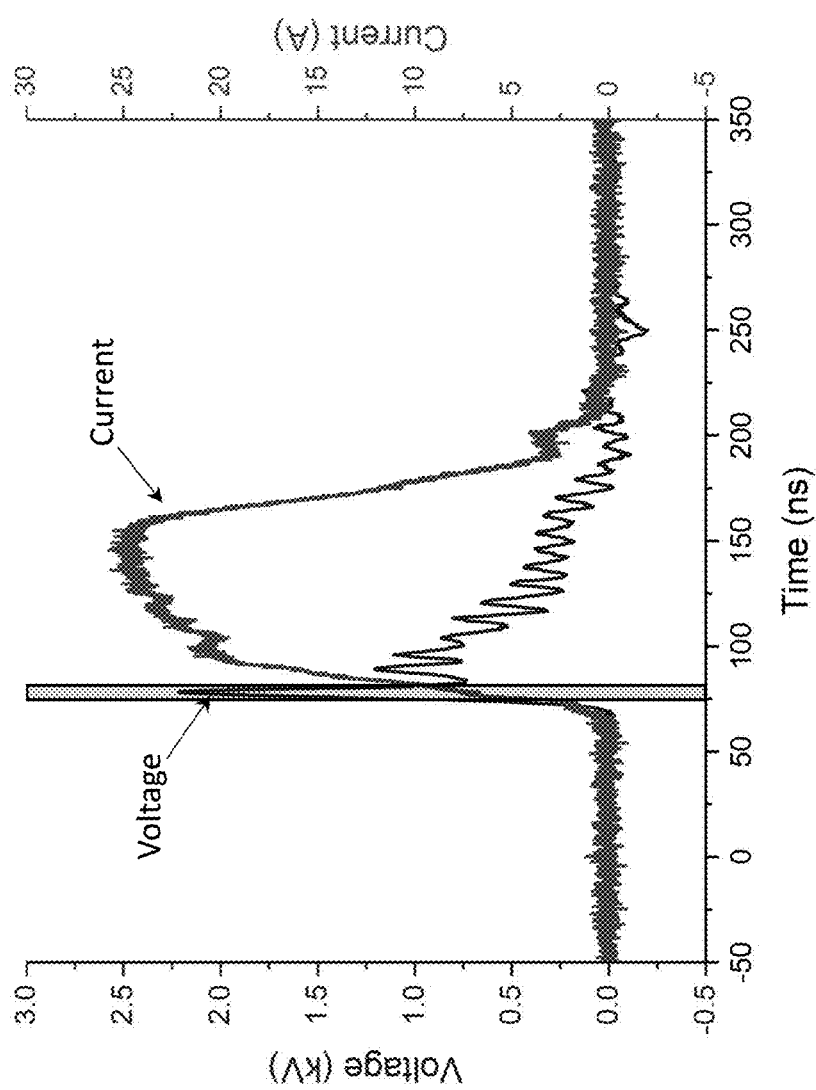
FIG. 5 is a graph plotting the voltage/current waveform of a probing pulse with $\Delta t = 20$ microseconds. The shaded area represents the duration when an ICCD camera gate was open. The waveform of the probing pulse is different from that of the NRP discharge pulse in FIG. 3 due to the impedance change between electrodes in the wake of the NRP discharge.

FIG. 5 plots typical voltage/current waveforms of the probing pulse applied with a delay of $\Delta t$=20 microseconds after the NRP discharge. Application of the probing pulse caused additional breakdown of the gas and "re-illumination" of the second positive system in the spectrum. The shaded area in FIG. 5 represents the time window (5 ns) when the spectrum was acquired by the spectrometer. The V/I waveforms look very different from that of the NRP pulse shown in FIG. 3 due to the better impedance matching with the pulser caused by the decaying of the plasma and heated gas in the gap between the electrodes. As the delay time $\Delta t$ was increased to several ms, the shape of the V/I waveforms became similar to that shown in FIG. 3 due to the completion of the plasma decay.

Figures 6A, 6B:
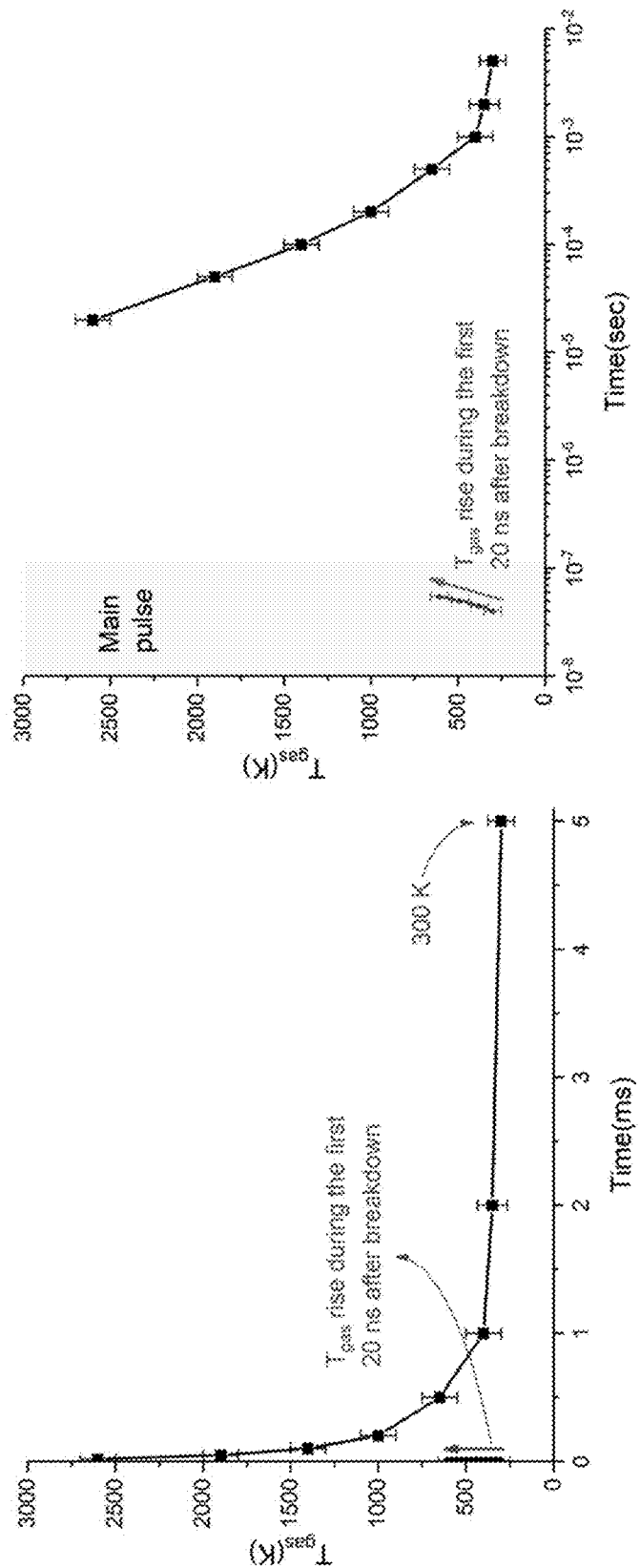
FIGS. 6A and 6B are graphs plotting the temporal evolution of a rotational temperature measured using the OES technique enhanced by nanosecond probing pulse in linear time scale (FIG. 6A) and in log time scale (FIG. 6B).

The gas temperature evolution after the NRP discharge was determined using this method for probing pulse delays 20, 50, 100, 200, 500, 1000, 2000 and 5000 microseconds as shown in FIGS. 6A and 6B. The error bars correspond to the temperature range required to keep the SPECAIR-simulated spectra within the limits of the experimental data spread. Time zero implies the NRP discharge event (as in FIG. 3). FIGS. 6A and 6B evidence that the gas temperature was measured to be approximately 2600 K at 20 microseconds after the NRP discharge, decreased to about 650 K at 500 microseconds, and finally reached about 300 K at 5 ms after the discharge.

It was confirmed that gas heating due to the probing pulse itself is negligible as long as the spectrum of the $N_2$ second positive system is acquired during only the first 5 ns of the probing pulse. Several previous investigations reported in the literature have assumed that heating by the probing pulse during the first several nanoseconds after its onset is negligible. However, this is not a universally-accepted fact and was deemed to require further proof as the temperature rise is clearly dependent on the probing pulse parameters (amplitude, dV/dt) and a substantial rise of the rotational temperature can be observed even during the first 5 ns period of the pulse. Therefore, probing pulse parameters were customized for each specific experiment to make sure that the heating by the probing pulse was negligible, while the emission of the second positive system of nitrogen is sufficient to conduct the OES measurements. During investigations reported herein, temperatures measured at the first 5 ns of the NRP discharge and at 5 ms afterward agreed with the true unperturbed room temperature of 300 K. Thus, it was concluded that gas heating by the specific probing pulse used in the investigations is negligible on the timescale of 5 ns. The total electrical energy deposition during the first 5 ns of the probing pulse was about 4 to 5 times smaller if the probing pulse was applied with a 20-microsecond delay rather than one applied with a 5 ms delay (see the V/I waveforms shown in FIG. 3 and FIG. 5); specifically, 0.06 mJ for $\Delta t$=20 microseconds and 2.6 mJ for $\Delta t$=5 ms. As such, gas heating by the probing pulse applied with a 20-microsecond delay is expected to be even less pronounced.

Methods and systems as disclosed herein provide the capability of gas temperature measurements utilizing optical emission spectroscopy enhanced with probing nanosecond plasma pulse. The methods and systems were demonstrated to be applicable to measuring gas temperature evolution up to 5 microseconds after an NRP discharge. In the nonlimiting investigations described above, for an NRP discharge in a pin-to-pin configuration, the temperature of a gas peaked at about 2600 K about 20 microseconds after the discharge and cooled to about 650 K at about 500 microseconds after the NRP discharge. On this basis, the methods and systems as disclosed herein can be utilized as thermometers for temporally-resolved gas thermometry and applied to obtain spatially (controlled by the distance (d) of the inter-electrode gap) and temporally (down to 5 ns) resolved measurements of gas temperatures in various applications with different gas mixtures under various pressures. As nonlimiting examples, the approach can be used for combustion thermometry in various gas mixtures and pressure ranges in cases where the Boltzmann distribution of rotational levels in the $N_2(C)$ state can be experimentally confirmed. Methods as disclosed herein are particularly well suited for temperature measurements in plasma-assisted ignition/combustion systems that are already equipped with electrodes that can be used to apply probing pulses. Other applications are foreseeable. In comparison with traditional means of temperature measurement such as thermocouples, methods disclosed herein are characterized by better temporal resolution, generally on the order of about 5 ns or less. Spatial resolution of the temperature measurements (generally on the order of about 1 mm or less) can be achieved by appropriate positioning of the electrodes and choosing appropriate inter-electrode gap distances. In addition, it is foreseeable that the combination of a high-voltage pulse generator and a pin-to-pin electrode assembly can be replaced by a short and focused laser pulse to create a plasma discharge, and that such a non-electrode systems utilizing a laser-induced plasma as a probing pulse could be advantageous if insertion or use of pin electrodes is not practical or possible. It is also foreseeable that temperature measurements may be performed immediately after the NRP pulse using higher pulse repetition frequencies or using a separate pulser that creates probing pulses along with appropriate synchronization, and measurements of gas temperature profiles can be performed across a spark channel by means of imaging the discharge directly onto the slit of a spectrometer.

In view of the foregoing, the investigations evidence a method of measuring the temperature of a gas by creating a probing nanosecond plasma pulse (a pulse length of 10 ns or less, preferably 5 ns or less) preferably having a high current (peak>10 A) but weak since the pulse duration is intentionally very short so as not to appreciably heat the gas being measured. Though of short duration, the plasma pulse still produces a light emission signal that can then be acquired by a spectrometer and processed with software to determine the gas temperature. It is believe that it was previously not recognized that it would be physically feasible to establish plasma pulse parameters so that gas heating by a probing nanosecond plasma pulse would itself be negligible, while a light emission signal excited by the probing nanosecond plasma pulse would be sufficient to obtain temperature measurements. Such a method can, but is not required to, make use of the following components: a high-voltage pulse generator capable of generating very short pulses (generally less than 10 ns, preferably 5 ns or less) across two pin electrodes, a spectrometer, and software to determine the gas temperature from the spectra acquired by the spectrometer from within 5 ns of the initiation of a pulse.

While the invention has been described in terms of a particular embodiment and investigations, it should be apparent that alternatives could be adopted by one skilled in the art. For example, the system 10 and its components could differ from what is described herein and shown in the drawings, and functions of certain components of the system 10 could be performed by components of different construction but capable of a similar (though not necessarily equivalent) function, and parameters such as temperatures and durations could be modified. As such, it should be understood that the intent of the above detailed description is to describe the particular embodiment represented in the drawings and certain but not necessarily all features and aspects thereof, and to identify certain but not necessarily all alternatives to the particular embodiment represented in the drawings. Accordingly, it should be understood that the invention is not necessarily limited to any particular embodiment represented in the drawings or described herein, and that the purpose of the above detailed description and the phraseology and terminology employed therein is to describe the particular embodiment represented in the drawings, as well as investigations relating thereto, and not necessarily to serve as limitations to the scope of the invention. Therefore, the scope of the invention is to be limited only by the following claims.

The invention claimed is:

1. A method of performing a measurement of a temperature of a gas, the method comprising:
generating a main nanosecond discharge pulse within a location in a totally gaseous sample of the gas that causes primary breakdown of the gas to form a plasma discharge and excite a first instance of a light emission signal;
generating a probing nanosecond plasma pulse within the location in the totally gaseous sample of the gas at the plasma discharge to initiate additional breakdown of the gas during decay of the plasma discharge after the first instance of the light emission signal disappears, wherein the probing nanosecond plasma pulse creates a lower maximum voltage in the plasma discharge than the main nanosecond discharge pulse, and wherein heating of the plasma discharge by the probing nanosecond plasma pulse is negligible; and
using an optical emission spectroscopy technique to measure the temperature of the totally gaseous sample of the gas by processing a second instance of the light emission signal that is excited by the probing nanosecond plasma pulse.

2. The method of claim 1, wherein the probing nanosecond plasma pulse is one of a plurality of plasma discharges of a nanosecond repetitively pulsed discharge.

3. The method of claim 1, wherein the second instance of the light emission signal occurs 5 to 5000 microseconds after the probing nanosecond plasma pulse.

4. The method of claim 1, wherein the measuring of the temperature of the totally gaseous sample of the gas is conducted in the wake of the probing nanosecond plasma pulse from initiation of the probing nanosecond plasma pulse to a time period after the additional breakdown of the gas.

5. The method of claim 1, wherein the probing nanosecond plasma pulse is generated between two electrodes.

6. The method of claim 5, wherein the two electrodes are pin electrodes.

7. The method of claim 1, wherein the probing nanosecond plasma pulse has a pulse length of 10 ns or less.

8. The method of claim 1, wherein the measuring of the temperature of the totally gaseous sample of the gas is spatially and temporally resolved to 5 nanoseconds.

9. The method of claim 1, wherein the measuring of the temperature of the totally gaseous sample of the gas comprises rotational and vibrational temperature measurements.

10. The method of claim 1, wherein the optical emission spectroscopy technique is conducted on the second positive system of nitrogen and the first and second instances of the light emission signal are emissions of the second positive system of nitrogen excited by the main nanosecond discharge pulse and the probing nanosecond plasma pulse, respectively.

11. The method of claim 10, wherein the optical emission spectroscopy technique acquires a spectrum of the second instance of the light emission signal during a first 5 ns after initiation of the probing nanosecond plasma pulse to eliminate an effect of heating of the totally gaseous sample of the gas by the probing nanosecond plasma pulse.

12. The method of claim 1, wherein the measuring of the temperature of the totally gaseous sample of the gas is performed in a combustion application.

13. A system for performing a measurement of a temperature of a gas, the system comprising:
means for generating a main nanosecond discharge pulse within a location in a totally gaseous sample of the gas that causes primary breakdown of the gas to form a plasma discharge and excite a first instance of a light emission signal;
means for generating a probing nanosecond plasma pulse within the location in the plasma discharge in the totally gaseous sample of the gas to initiate additional breakdown of the gas during decay of the plasma discharge after the first instance of the light emission signal disappears, wherein the probing nanosecond plasma pulse creates a lower maximum voltage in the plasma discharge than the main nanosecond discharge pulse, and wherein parameters of the probing nanosecond plasma pulse are such that heating of the plasma discharge by the probing nanosecond plasma pulse is negligible;

an optical emission spectrometer that receives a second instance of the light emission signal excited by the probing nanosecond plasma pulse within 5 ns of initiating the probing nanosecond plasma pulse; and means for determining the temperature of the gas from the second instance of the light emission signal.

14. The system of claim 13, wherein the generating means is a high-voltage pulse generator.

15. The system of claim 13, wherein the pulse generator generates the probing nanosecond plasma pulse between two electrodes have a gap distance therebetween.

16. The system of claim 13, wherein the pulse generator generates the probing nanosecond plasma pulse to have a pulse length of 10 ns or less.

17. The system of claim 13, wherein the means for determining comprises software that determines the temperature of the totally gaseous sample of the gas from spectra acquired by the spectrometer.

* * * * *